US009261605B2

(12) United States Patent
Sur et al.

(10) Patent No.: US 9,261,605 B2
(45) Date of Patent: Feb. 16, 2016

(54) DIRECTIONAL RADIATION DETECTION APPARATUS AND METHOD USING INVERSE COLLIMATION

(76) Inventors: Bhaskar Sur, Deep River (CA); Shuwei Yue, Deep River (CA); Arjun Das, Deep River (CA); Guy Jonkmans, Deep River (CA)

( * ) Notice: Subject to any disclaimer, the term of this patent is extended or adjusted under 35 U.S.C. 154(b) by 238 days.

(21) Appl. No.: 13/878,719

(22) PCT Filed: Oct. 15, 2010

(86) PCT No.: PCT/CA2010/001618
§ 371 (c)(1),
(2), (4) Date: Apr. 10, 2013

(87) PCT Pub. No.: WO2012/048399
PCT Pub. Date: Apr. 19, 2012

(65) Prior Publication Data
US 2013/0206995 A1    Aug. 15, 2013

(51) Int. Cl.
*G21K 1/02* (2006.01)
*G01T 1/16* (2006.01)
*G01T 7/00* (2006.01)

(52) U.S. Cl.
CPC .... *G01T 1/16* (2013.01); *G01T 7/00* (2013.01)

(58) Field of Classification Search
CPC ........................................................ G21K 1/02
See application file for complete search history.

(56) References Cited

U.S. PATENT DOCUMENTS

| 5,286,973 | A | * | 2/1994 | Westrom et al. ............... 250/253 |
| 7,186,963 | B2 | | 3/2007 | Hughes et al. ............. 250/208.1 |
| 7,242,003 | B2 | | 7/2007 | Wagenaar et al. ......... 250/363.1 |
| 7,335,888 | B2 | | 2/2008 | Wagenaar et al. ....... 250/363.05 |
| 2007/0223651 | A1 | | 9/2007 | Wagenaar et al. .............. 378/37 |

OTHER PUBLICATIONS

International Preliminary Amendment on Patentability issued in PCT Application No. PCT/CA2010/001618, issued Apr. 16, 2013.
International Search Report issued in PCT Application No. PCT/CA2010/001618, mailed Apr. 7, 2011.
Maughan et al., "Radiological properties of a prototype multi-rod collimator for producing irregular fields in photon radiation therapy", *Med Phys.*, 22(1):31-36, 1995.

* cited by examiner

*Primary Examiner* — David Porta
*Assistant Examiner* — Hugh H Maupin
(74) *Attorney, Agent, or Firm* — Norton Rose Fulbright US LLP (57) ABSTRACT

The present invention provides a radiation detector for detecting both the intensity and direction of one or more sources of radiation comprising a radiation sensor, an inverse collimator that shields the sensor from at least a portion of the incident radiation originating from the direction in which the inverse collimator is pointed and a means for pointing the inverse collimator in different directions. In accordance with another aspect of the invention, there is provided a method for detecting both the intensity and direction of one or more sources of radiation comprising the steps of providing a radiation sensor, providing an inverse collimator that shields the sensor from at least a portion of the incident radiation originating from the direction in which the inverse collimator is pointed, providing a means for pointing the inverse collimator in different directions, pointing the inverse collimator in a direction, recording the direction in which the inverse collimator is pointed and recording the signal from the sensor, repeating the preceding two steps one or more times for one or more different directions.

19 Claims, 13 Drawing Sheets

DIRECTIONAL RADIATION DETECTION APPARATUS AND METHOD USING INVERSE COLLIMATION

CROSS-REFERENCE TO RELATED APPLICATIONS

This application is a national phase application under 35 U.S.C. §371 of International Application No. PCT/CA2010/001618 filed 15 Oct. 2010, the entire contents of which is specifically incorporated herein by reference without disclaimer.

FIELD OF THE INVENTION

The present invention relates to the field of radiation detection and instrumentation and methods for detecting radiation. More particularly, the present invention pertains to a method and apparatus for directional radiation detection.

BACKGROUND

In environments that may have multiple radiation sources present, and that are potentially moderately to highly radioactive (e.g. nuclear processing or decontamination facilities), manual access is limited for safety reasons, and load limits are present with respect to mechanical and electrical support. Desirable attributes of a directional radiation detection apparatus for use in such an environment are that the apparatus should be rugged, remotely operated, self-contained, lightweight, inexpensive so that it can be disposed of after use rather than decontaminated, and it should be able to survey a radioactive environment in as little time as possible. Existing methods for detecting both the intensity and direction of one or more radiation sources in a moderately to highly radioactive environment suffer from serious drawbacks.

Two standard methods exist for measuring both the direction and intensity of a source of radiation in an environment as described above. First, a non-directional radiation detection apparatus can be transported from place to place within the environment to be surveyed. By conducting a grid search in this manner, the location of the source or sources of radiation can be determined. The major drawback of this method is that it is time intensive.

Second, a collimator can be used to create a very strongly directional detection apparatus. By pointing the collimated detector in different directions, an image of radiation intensity versus direction can be obtained. A collimator, as used in such detectors, includes a radiation shield that surrounds a radiation sensor, and an opening through which radiation from a radiation source is collimated. The major drawback of this method is that the collimator shield component must be made of a heavy material such as lead or stainless steel, such that a very strong and therefore expensive mechanism is needed to move the collimated detector so that it can be pointed in different directions. An example of this type of apparatus is disclosed in U.S. Pat. No. 7,186,963, which is incorporated herein by reference.

There remains a need for an improved directional radiation detection apparatus that is relatively lightweight and inexpensive.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a radiation detector and method for measuring both the intensity and direction of one or more sources of radiation in an environment.

In accordance with an aspect of the invention, there is provided a radiation detector for detecting both the intensity and the direction of one or more sources of radiation, comprising a radiation sensor, an inverse collimator that shields the sensor from at least a portion of the incident radiation originating from the direction in which the inverse collimator is pointed, and a means for pointing the inverse collimator in different directions.

In accordance with another aspect of the invention, there is provided a radiation detector for detecting both the intensity and the direction of one or more sources of radiation, comprising a pan motor, a tilt motor, a u-shaped support that has a base and two arms, an inverse collimator comprising a first rod and a second rod, and a radiation sensor. The shaft of the pan motor is operably connected to the base of the u-shaped support such that rotation of the shaft causes rotation of the u-shaped support. The tilt motor is operably connected to the arms of the u-shaped support such that the rotation of the shaft causes rotation of the tilt motor within the arms. The first and second rods are attached to the tilt motor in longitudinal alignment with each other but on opposite sides of the axis of rotation of the tilt motor. The radiation sensor is mounted to the first rod at the end of the first rod that is farthest from the tilt motor. Rotation of the pan and tilt motors allows the inverse collimator to be pointed in different directions. The inverse collimator and tilt motor shield the sensor from at least a portion of the incident radiation originating from the direction in which the second rod is pointed.

In accordance with another aspect of the invention there is provided a method for detecting both the intensity and the direction of one or more sources of radiation comprising the steps of: (a) providing a radiation sensor; (b) providing an inverse collimator that shields the sensor from at least a portion of the incident radiation originating from the direction in which the inverse collimator is pointed; (c) providing a means for pointing the inverse collimator in different directions; (d) pointing the inverse collimator in a direction; (e) recording the direction in which the inverse collimator is pointed and recording the signal from the sensor; and (f) repeating steps (d) and (e) one or more times for one or more different directions.

DETAILED DESCRIPTION

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

Figure 1:
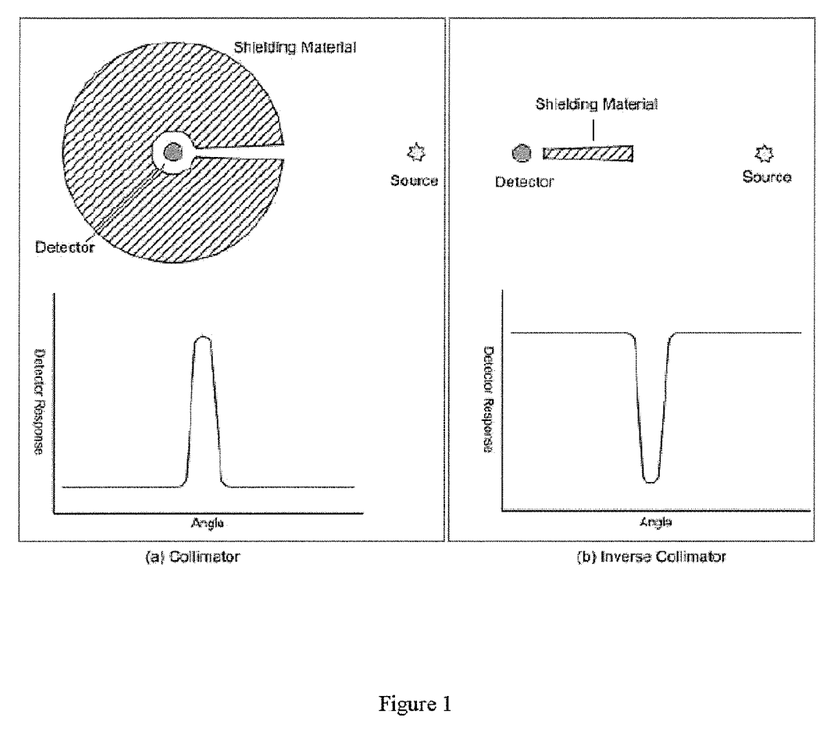
FIG. 1 is a schematic representation of the difference in principle of operation between a directional radiation detector employing a collimator and a radiation detector that employs an inverse collimator.

It has now been found that an inverse collimator can be used in an improved method and apparatus for detecting both the direction and intensity of one or more sources of radiation. As detailed above, current methods and devices for detecting radiation employ a collimator, which includes a shield that blocks a radiation field incident on a radiation sensor from all directions except a narrow beam. In contrast, an inverse collimator comprises of a small radiation shield that blocks the ionizing radiation field only in a narrow beam and allows the detector to detect radiation from all other directions. Where a detector employing a collimator will generate its largest response when pointed at a source of radiation, a detector employing an inverse collimator will generate its smallest response when pointed at a source of radiation (i.e., when the radiation shield of the inverse collimator is between a radiation sensor and the source of radiation). FIG. 1 illustrates the difference in principle of operation between a detector employing a collimator, and a detector employing an inverse collimator.

Because significantly less shielding material is employed for the inverse collimator, its incorporation in a radiation detector allows the detector to be smaller, lighter, and less robustly constructed than current or previous radiation detection systems. Furthermore, the use of an inverse collimator allows the radiation detector to be remotely pointed in different directions using a relatively small and inexpensive mechanical drive.

The inverse collimator is advantageously a rod made of lead, tungsten, or stainless steel. However, the inverse collimator can also be made of any other material capable of shielding the detector from ionizing radiation. The cross-section of the rod is optionally circular, but can have other cross-sections.

Figure 2:
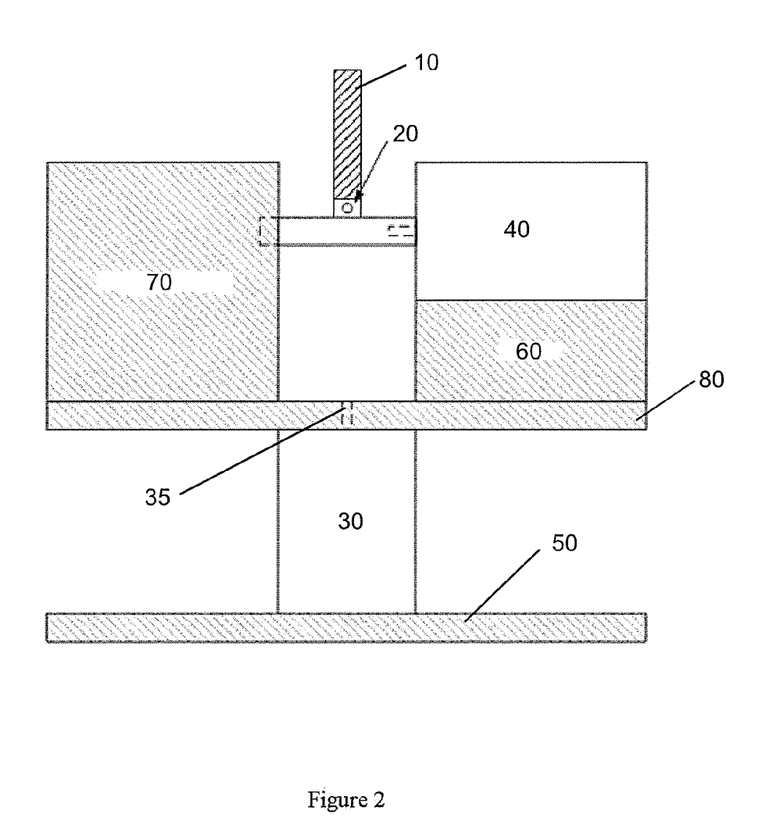
FIG. 2 is a schematic representation of one example of a directional radiation detector comprising an inverse collimator.

With reference to FIG. 2, one embodiment of a radiation detector employs inverse collimator 10 that is a lead rod to which the radiation sensor 20 is affixed. Radiation sensor 20 shown in FIG. 2 is based on a solid state diode that emits an electrical signal in response to ionizing radiation.

Figure 3:
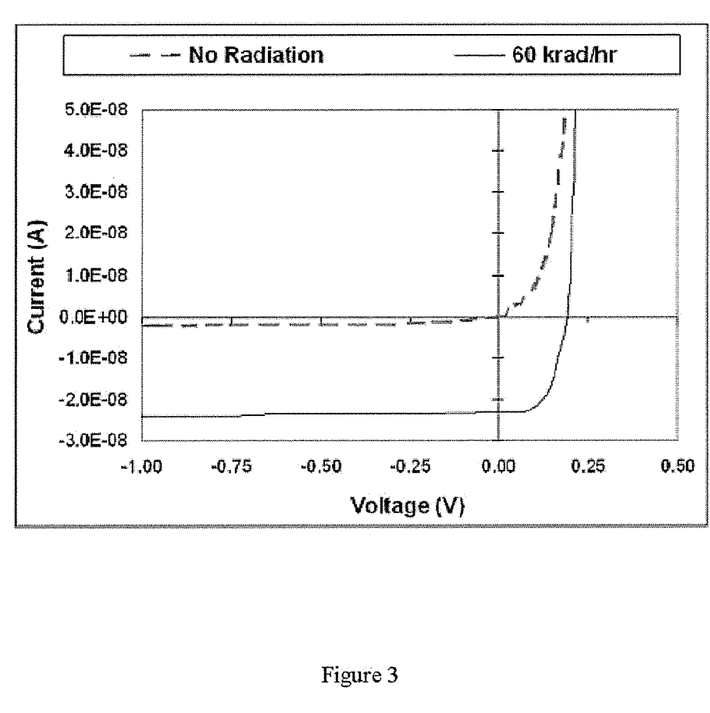
FIG. 3 is a graph depicting the effect of a radiation field on current and voltage readings of a p-n junction silicon diode.

Radiation sensor 20 preferably comprises a commercially available solid state p-n junction potted silicon diode used in unbiased current generation mode, and the output photocurrent is used as a measurement of the radiation field strength. While not wishing to be bound by theory, the theory behind using a diode as a radiation sensor is that diodes react to radiation the same way photodiodes react to visible light. When a diode is exposed to a radiation field, a reverse current is generated in the diode even when there is no voltage applied (i.e., unbiased mode). On a current-versus-voltage curve (IV Curve), this effect is visible as a downward shift of the curve in the presence of a radiation field (see FIG. 3). The relationship between this photocurrent and the radiation field strength has been studied by the inventors and found to be approximately linear.

The primary advantages of using silicon diodes as the radiation sensors in the imaging detector are that they are small, inexpensive and work for a very large range of gamma radiation dose rates.

Having a small sensor allows the overall size of the radiation detector of the present invention to be minimized, which allows the detector to be used in confined spaces and allows it to be used in a way that causes less disruption to its surroundings. The diode is not only small, but is simple to interface with. Diodes do not have the same number of inputs and outputs of different media as are common in commercially available radiation detectors. The size and simplicity of the instrument permits great versatility in the system that uses it as a sensor.

Various commercially available p-n junction silicon diodes have been calibrated and tested by the present inventors as radiation sensors in the directional radiation detector comprising an inverse collimator. These silicon diode sensors have been used to successfully measure radiation fields in applications in a wide range of radiation field intensities. These sensors can measure fields as low as tens of rad/hr and as high as hundreds of krad/hr (see Sur et al., "Radiation Exposure Rate and Liquid Level Inside a High Level Liquid Waste (HLLW) Storage Tank", Proceedings of the 28$^{th}$ Annual CNS Conference, Saint John, NB 2007 Jun. 3-6, and see also Sur et al., "A Detector System for Measuring High Radiation Fields, paper presented at the Sixth American Nuclear Society International Topical Meeting on Nuclear Plant Instrumentation, Control, and Human-Machine Interface Technologies NPIC&HMIT, Knoxville Tenn., Apr. 5-9, 2009).

Because the current output from p-n junction silicon diodes is small (on the order of pico amps to nano amps), it is preferable to use a current to voltage amplifier to amplify and convert the current signal into a voltage signal in the range of approximately 0.25 V to 8.5 V, which can be easily read with a device such as a multimeter.

While a silicon diode-based sensor is preferred because it is relatively inexpensive and small, the sensor can also be a scintillation detector or any other type of sensor that can detect ionizing radiation and is of a size and geometry such that the inverse collimator 10 blocks a significant portion of the radiation originating from a source located in the direction in which the inverse collimator 10 is pointing. The radiation detector and method of the present invention can optionally employ more than one sensor. In an alternative embodiment of the invention, two sensors are employed, with a sensor attached to each end of the inverse collimator. The use of a sensor on each end of the inverse collimator reduces by half the number of measurements needed to achieve a given resolution when surveying an environment for sources of radiation.

In order to permit the measurement of the intensity and direction of ionizing radiation originating from multiple sources within an environment without changing the location of the apparatus within the environment, the apparatus is advantageously equipped with pan-tilt functionality, whereby the inverse collimator 10 can be aimed in different directions.

Preferably, the device should be able to look around itself across the entire range of directions in a sphere in steps of various sizes (depending on the resolution required) and collect radiation measurements as it is aimed in different directions. In order to achieve a resolution of 5 degrees by 5 degrees across the entire sphere, approximately 1700 steps, with measurements taken at each step, are required. For a resolution of 2 degrees by 2 degrees, approximately 10,000 steps, with measurements taken at each step, are required. In order to achieve a full sphere of range, the range of motion required is 180 degrees in tilt and 360 degrees in pan. To achieve this range of motion, two axes of rotation are required—one for pan and one for tilt.

Again with reference to the embodiment of the invention shown in FIG. 2, the pan/tilt functionality is achieved by way of motors 30 and 40. Pan motor 30 is affixed to base 50 and provides the pan functionality. Tilt motor 40, is affixed to platform 60 and provides tilt functionality. The off-centre weight of motor 40 is counteracted by balancing weight 70.

The shaft 35 of pan motor 30 is operably connected to movable support 80. When the shaft of motor 30 rotates, support 80, and the other components of the apparatus located above platform 80, including the inverse collimator, also rotate.

The shaft of tilt motor 40 is operably connected to support 90, which in turn is operably connected to the inverse collimator 10. As such, when the shaft of tilt motor 40 rotates, the inverse collimator 10 also rotates.

Figure 4:
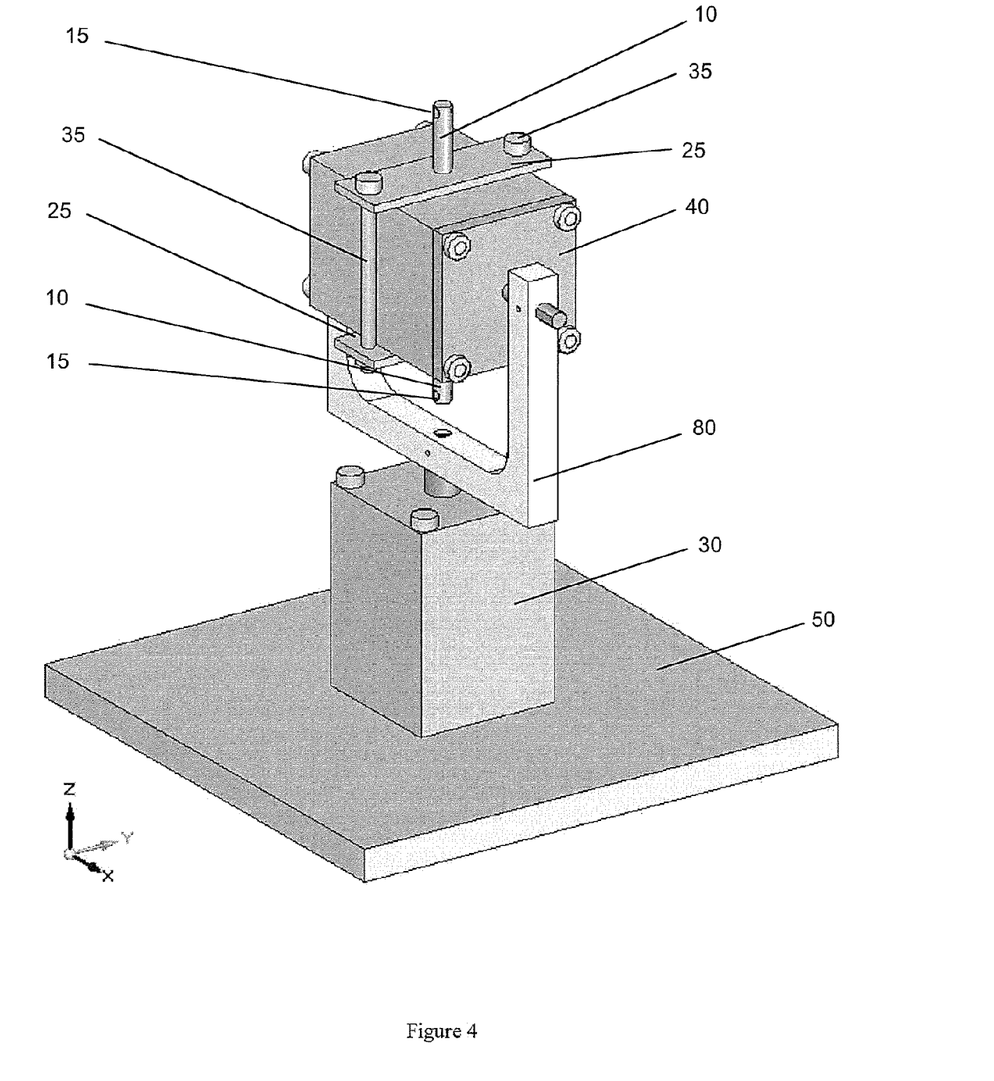
FIG. 4 is an isometric schematic view of a preferred example of a directional radiation detector comprising an inverse collimator.
Figure 5:
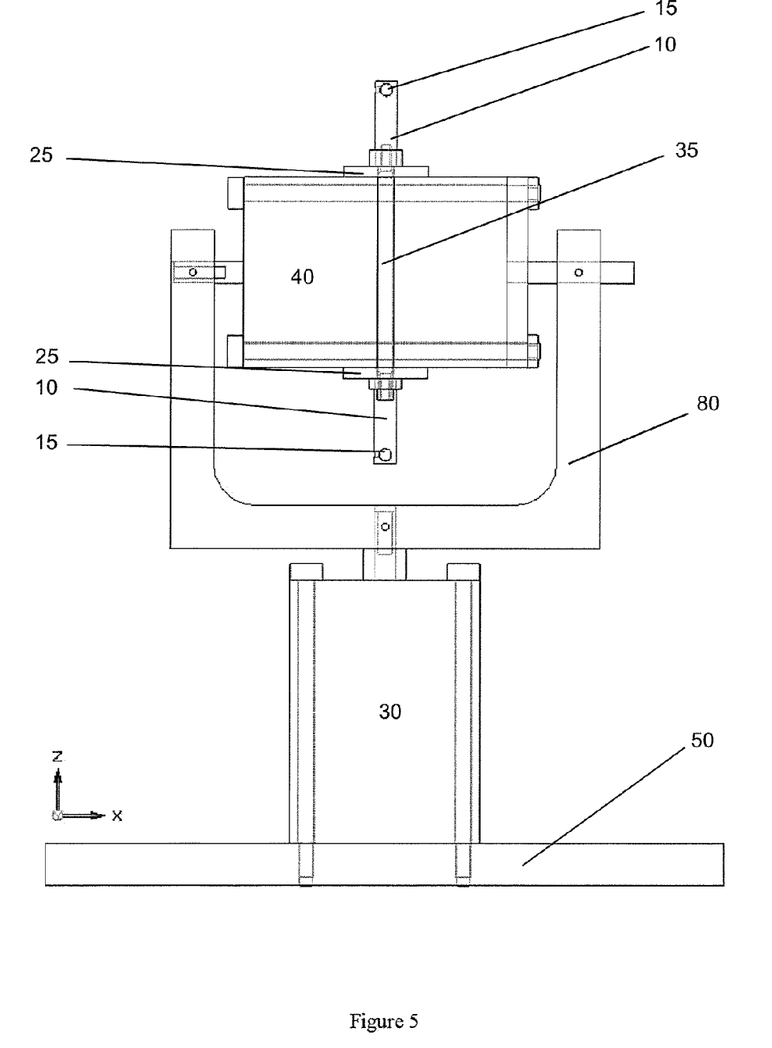
FIG. 5 is a front schematic and partial cross-sectional view of the directional radiation detection apparatus shown in FIG. 4.

FIGS. 4 and 5 show a preferred embodiment of the radiation detector of the present invention in which the motors and inverse collimator are configured such that the motor responsible for tilt functionality is incorporated in the inverse collimator geometry. The rod which comprises inverse collimator 10 is divided into two parts located on opposite sides of the axis of rotation of tilt motor 40. The tilt motor 40 contributes to the shielding of the detector and therefore can be considered part of the inverse collimator. The shaft of the tilt motor 40 is operably connected to movable u-shaped support 80, which in turn is operably connected to the shaft of pan motor 30. The main advantage of this design over the embodiment shown in FIG. 2 is that it avoids the need for a balancing weight, which reduces the overall weight of the apparatus. The two rods of the inverse collimator 10 are mounted to the tilt motor by means of support plates 25, which are held in place by bolts 35.

The sensor (not shown) is attached to either rod of the inverse collimator 10 at the end furthest from the tilt motor 40. The sensor is inserted through hole 15 that is drilled perpendicular to the longitudinal axis of the inverse collimator rod 10. A threaded hole through the top of the end of the inverse collimator rod 10 parallel to its longitudinal axis (not shown) can be employed in combination with a set screw (not shown) to hold the sensor in place. In an alternative embodiment of the invention, two sensors can be used with a sensor inserted into the end of each rod 10 through hole 15.

The motors employed for pan and tilt functionality are preferably stepper motors that allow for precise position control. For example, a SureStep™ stepper motor system from Automation Direct can be employed. Such a set includes two NEMA 23 size stepper motors, two microstepping drives, and a power supply. The motors have a basic step size of 1.8° and the drives allowed microsteps of half, one-fifth, one-tenth, one-twentieth and one-fiftieth of a basic step. The power supply takes an input of 120 VAC and has outputs of 32 VDC for motor and drive power and 5 VDC for signals. Smaller NEMA 17 size motors may be employed and are considered adequate for the design shown in FIGS. 4 and 5.

Figure 6:
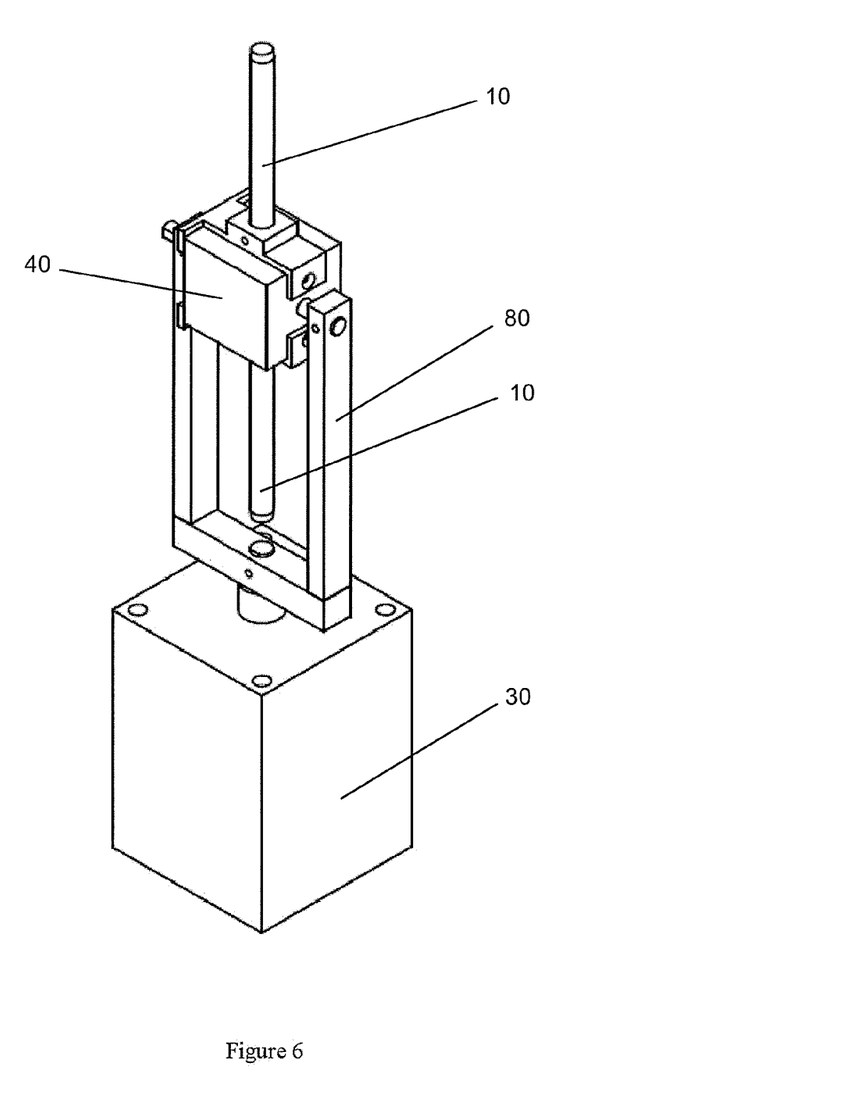
FIG. 6 is an isometric schematic view of another example of a directional radiation detector comprising an inverse collimator.

Another example of a radiation detector that employs inverse collimation is depicted in FIG. 6. In this embodiment pan motor 30 is a NEMA 23 size motor and tilt motor 40 is a NEMA size 11 stepper motor (alternatively a NEMA size 8 stepper motor, or equivalent, can be used for tilt functionality). The rods of the inverse collimator 10 and the arms of the u-shaped support 80 are longer than those employed in the embodiment shown in FIGS. 4 and 5. The inverse collimator rod(s) include holes to accommodate the sensor or sensors (not shown in FIG. 6).

Figure 7:
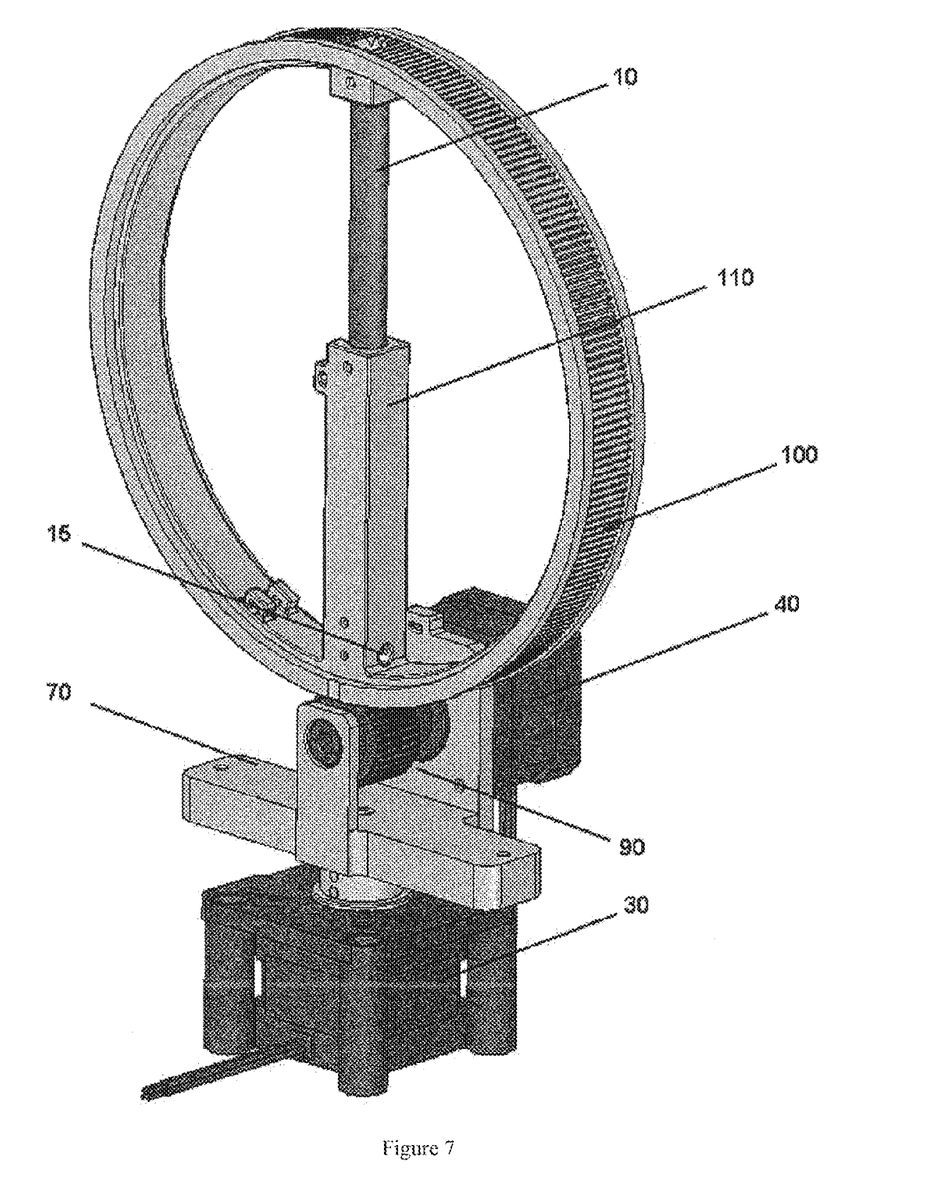
FIG. 7 is an isometric schematic view of another example of a directional radiation detector comprising an inverse collimator, in which the inverse collimator is a diametrical spoke of a vertically oriented gear wheel.

A further example of a radiation detector that employs inverse collimation is depicted in FIG. 7. In this example, the inverse collimator 10 is mounted in a diametrical spoke 110 of a vertically oriented gear wheel 100, captured in place and rotated for tilt by stepper motor 40 by means of a driver gear 90, which is operably connected to the shaft of tilt motor 40. This configuration provides the possibility of an inexpensive and unobtrusive tilt mechanism by manufacturing the gear wheel using a plastic "3D printer", although other means for manufacturing the gear wheel can be readily employed, and placing the tilt motor 40 out of the inverse collimator and thus not contributing to detector shielding. Gear wheel 100, driver gear 90 and tilt motor 40 are captured in place on wheel base 70, which is in turn operably connected to the shaft of pan motor 30 to provide pan functionality. In accordance with a specific, non-limiting, example of this embodiment, the radiation detector makes use of two NEMA 17 size stepper motors. FIG. 7 shows a breakaway section view of wheel base 70 in order to view the driver gear 90 and tilt motor 40. The wheel base 70 is designed to constrain the gear wheel 100 and driver gear 90 while allowing their gears to mesh and transmit motion. The radiation detector shown in FIG. 7 includes a single sensor inserted in hole 15 in diametrical spoke 110, however, an additional sensor can be incorporated in gear wheel 100 at a position approximately opposite the first sensor at hole 15.

Optionally, drives with acceleration/deceleration ramping features can be employed to reduce the jerking action on the apparatus that stepper motors can impart.

Radiation Detection Using Inverse Collimation

In order to obtain a map of the sources of radiation in an environment, a method can be employed whereby a radiation detector that includes an inverse collimator is used to scan the environment. To conduct a scan, the inverse collimator is pointed in various directions and the intensity of radiation incident on the sensor from each direction is recorded. A system employing such an inverse collimator generates a negative image of the sources of radiation in the environment. Mathematical image reconstruction can then be used to obtain a positive image from the scanned data. In an embodiment of the invention, the data can be displayed three dimensionally as a pattern of colours on a spherical surface projected on a computer screen.

Accordingly, the present application further provides a method of generating a radiation source map comprising (i) scanning at least part of an environment with a radiation detector that comprises a radiation sensor and an inverse collimator; and (ii) recording the intensity of radiation incident on the sensor at each position in the scan. The resulting negative image of the source(s) of radiation can be used directly to generate a radiation source map. Alternatively, as set out above, the method of generating a radiation source map further includes the step of mathematically reconstructing the negative image to generate a positive image from the recorded intensity of incident radiation.

As would be appreciated by persons skilled in the art, the signal processing, readout, and system control functions can be implemented in individual devices or integrated into a single device, and can be implemented using hardware (e.g., a PC computer), firmware (e.g., application-specific chips), software, or combinations thereof. The computer can be a general-purpose computer that includes a computer-readable memory for storing computer program instructions for carrying out processing and control operations. The computer can also include a disk drive, a compact disk drive, USB drive or other suitable component for reading instructions contained on a computer-readable medium for carrying out such operations. In addition to output peripherals such as a display and printer, the computer can contain input peripherals such as a mouse, keyboard, barcode scanner, light pen, or other suitable component known to persons skilled in the art for enabling a user to input information into the computer.

Figure 8A:
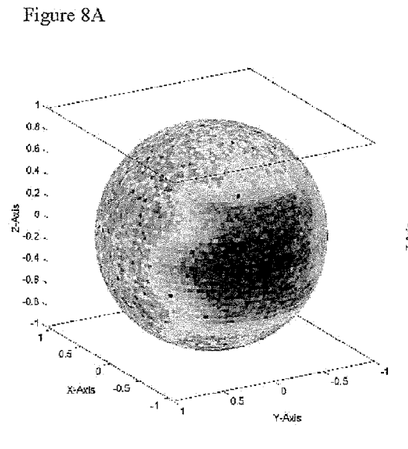
FIGS. 8A and 8B show two side views and FIG. 8C shows a top view of a MATLAB display of a 3D spherical image representing a survey of the radiation sources in an environment carried out using a directional radiation detector and method employing an inverse collimator.
Figure 8B:
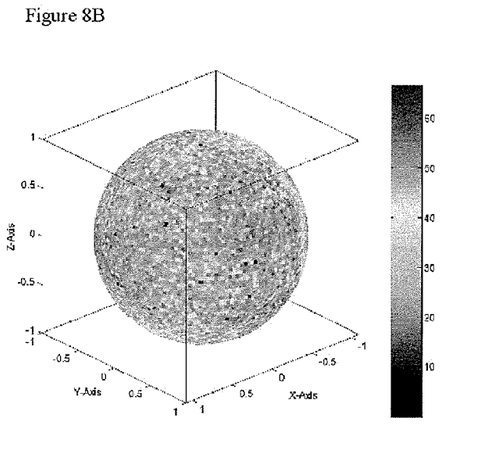
Figure 8C:
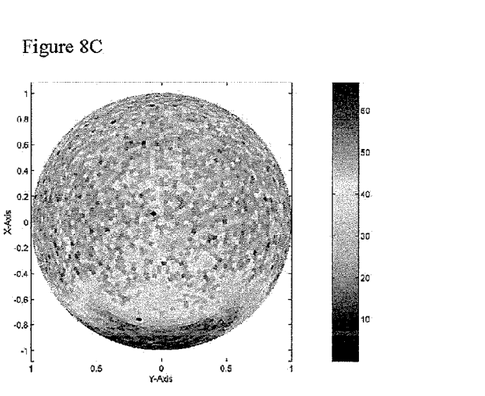

In one example, the radiation detector is controlled by a computer that includes a computer-readable memory that stores a computer program written specifically for the control of the radiation detector and/or for processing the data acquired using the radiation detector. In a preferred embodiment, the computer program is written using the LabVIEW™ platform that is designed for ease of communication with a variety of hardware. The program includes control, data acquisition, image generation and display functions. Image generation and display are achieved by recording the position and radiation data into a queue and using a MATLAB script to process the data and to display a (3D) spherical image. An example of such a display is shown in FIGS. 8A-8C. The dark area on the spheres represents a Co-60 source of radiation.

The computer program is written based on the particular application of the radiation detector and method of the present invention, and makes use of standard programming platforms that are well known to workers skilled in the field.

In accordance with one embodiment, there is provided a detection system that includes a computer for controlling the radiation detector of the present invention. The control computer can be positioned on-site, however, it is generally located sufficiently removed from the detector to permit users to control the detector without unnecessary exposure to radiation. The control computer can include a read-write device to allow output data to be permanently, or temporarily, stored in whole or in part. The read-write device facilitates recording of the data for later consideration. The output data can be post-processed using the on-site computer, or alternatively could be conveyed to a remote computer and processed there as a result.

The detection system can further include means for data acquisition, optionally on the control computer, and optionally in combination with means for controlling movement of the radiation detector.

In a preferred embodiment of the invention, a National Instruments Data Acquisition and Control Module (NI DAQ) is used as a data acquisition and control interface between the software and the radiation detector. The NI DAQ has a number of analog and digital inputs and outputs that the program uses for all input and control purposes. The analog input is used to obtain the current measurement from the radiation sensor and the digital I/O are used to obtain feedback and to control the amplifier gain setting remotely. The motors are controlled by sending pulses to the motor drives using the +5V digital outputs on the DAQ.

In a preferred embodiment of the invention, the control program has two modes of operation: manual and automatic. In both modes, all the real-time information is recorded into a computer file; this includes a timestamp, the position angles of the device (with respect to a set home position), and the sensor radiation readings including raw information such as the voltage signal and amplifier gain setting.

The data collected by the detection system, can comprise 3-dimensional information, including the distance of the source of radiation from the detection system and its direction (or location). The 3-dimensional information can be used to reconstruct a 3-dimensional map of radiation sources (within a certain distance) in the detection area.

Figure 9:
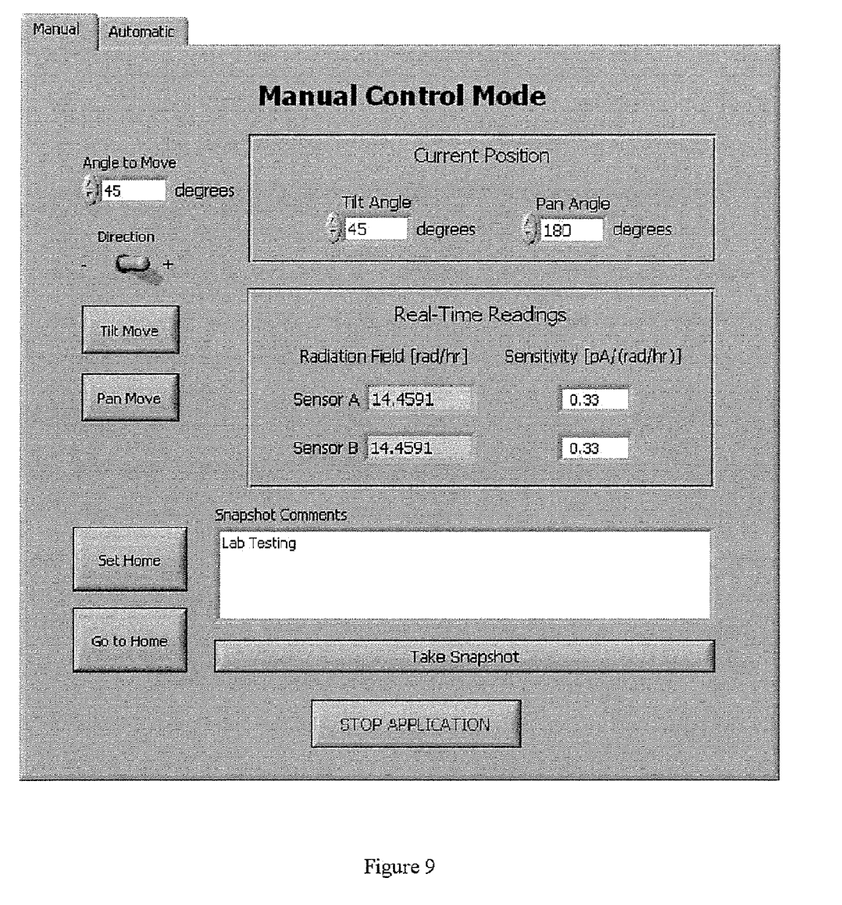
FIG. 9 shows a screen capture of a manual mode of directional radiation detection by a method employing inverse collimation.

In manual mode (see an example of a manual mode user interface in FIG. 9), the user can control the position of the device remotely while monitoring the radiation field readings. The user can pan or tilt the device in either direction in step sizes (in degrees) of his or her choosing. In addition, there is the capability to manually move the device to a desired position and set that position as the "Home Position", as well as return to the Home Position at any time. While monitoring the surroundings in manual mode, the user can take a 'snapshot' at any time. A snapshot will save all instantaneous details to a file. For example, the snapshot can save a timestamp, the position angles of the device, sensor radiation readings, and a user's comment. The sensitivity of the detector is set from the manual mode.

Figure 10:
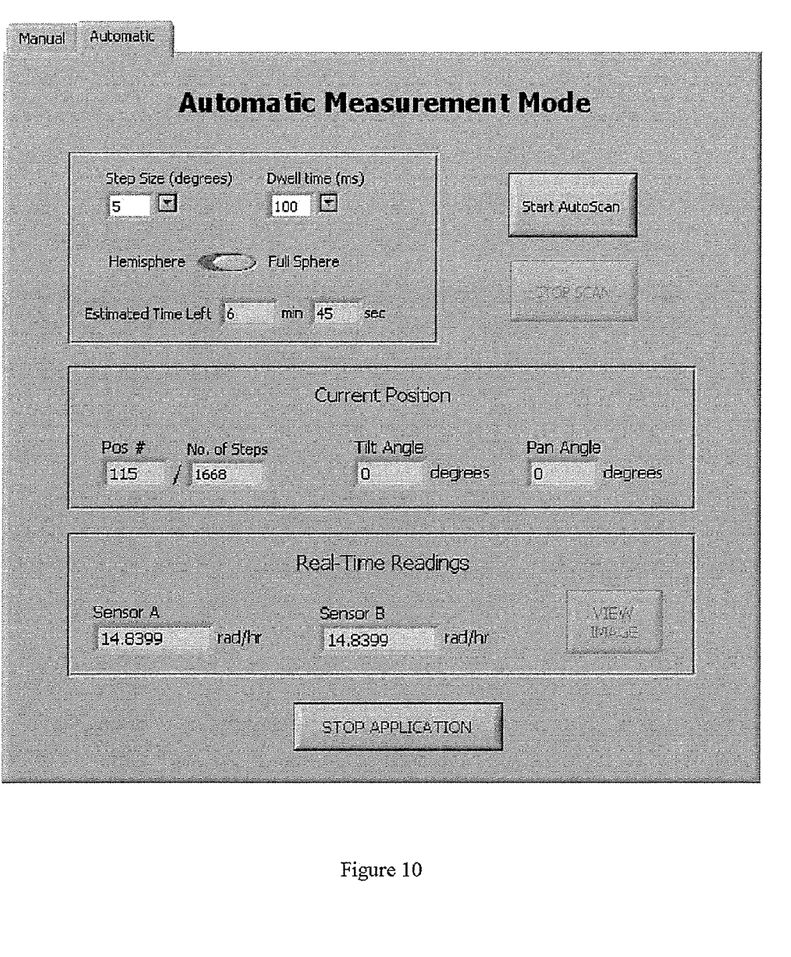
FIG. 10 shows a screen capture of automatic mode user interface for directional radiation detection by a method employing inverse collimation.
Figure 12A:
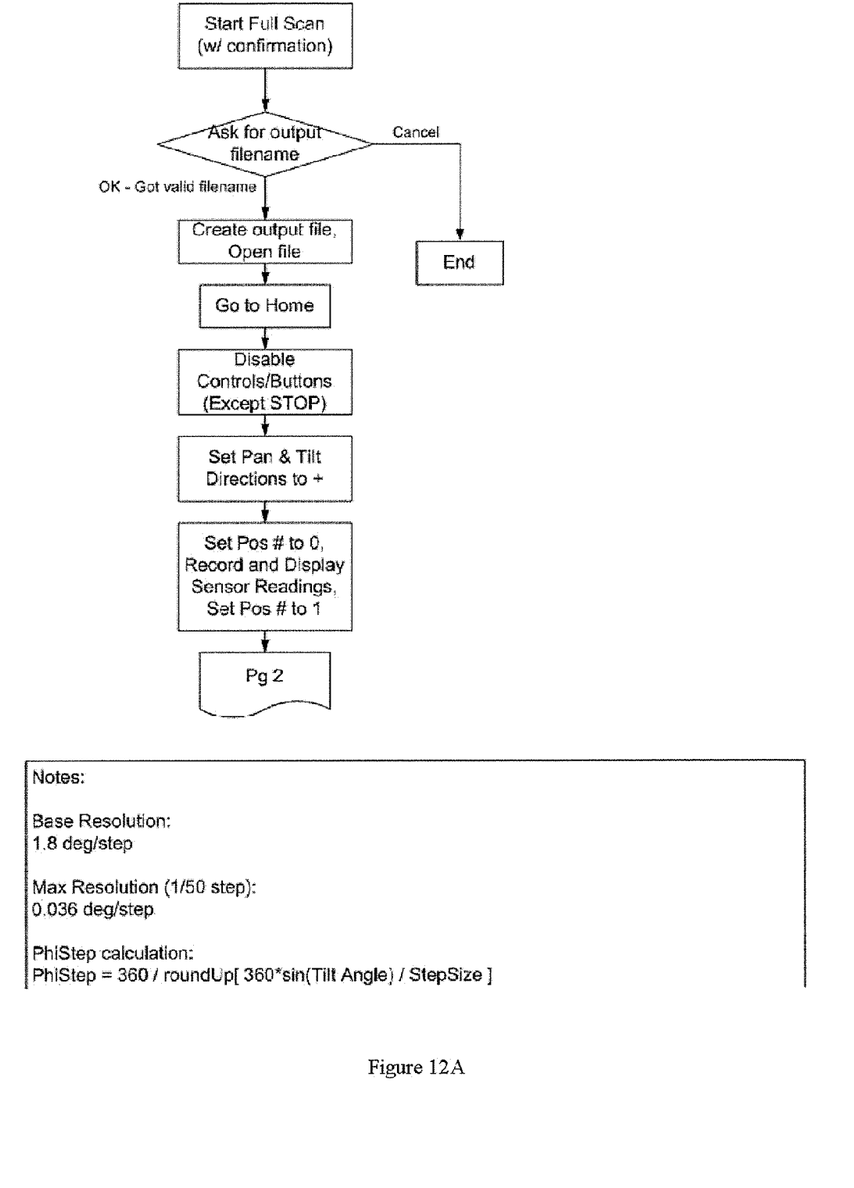
FIGS. 12A and 12B depict a flowchart of an automatic mode of directional radiation detection by a method employing inverse collimation.
Figure 12B:
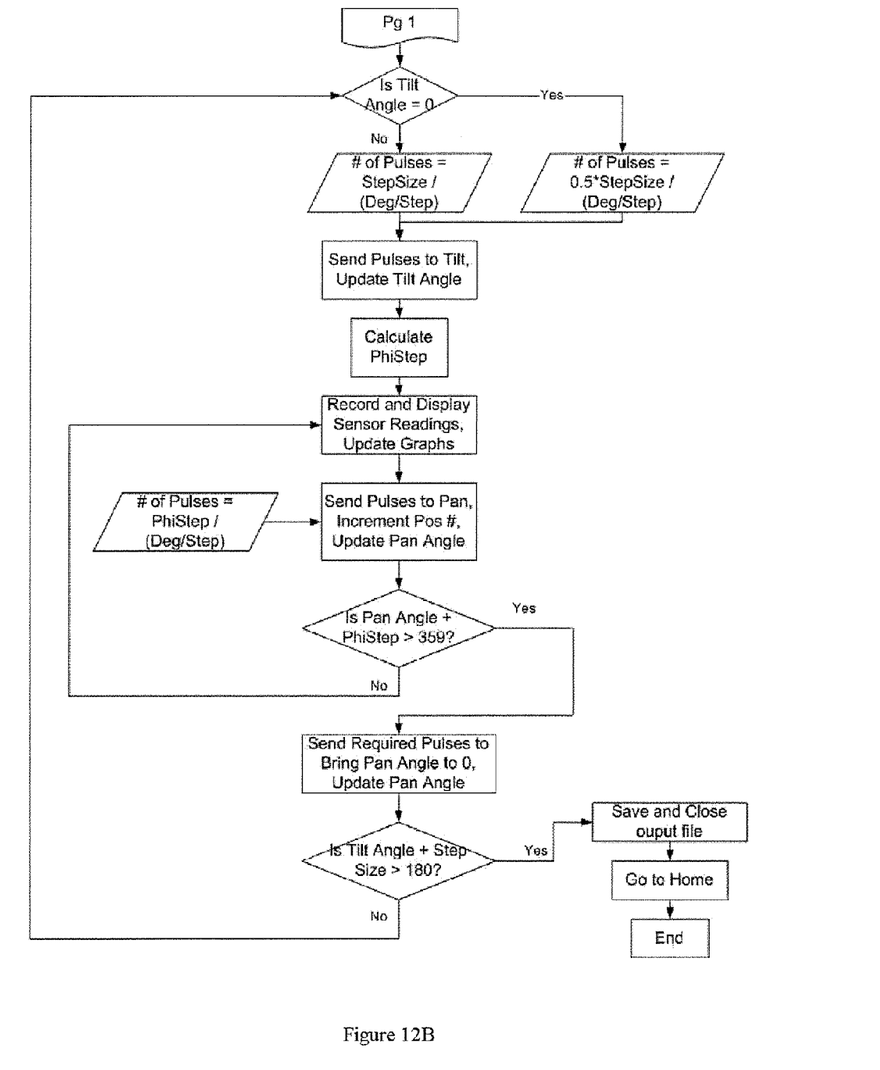

Automatic mode (see an example of an automatic mode user interface in FIG. 10) allows the user to carry out 'AutoScans', which scan the surroundings and display a radiation image. The user can control settings such as step size, dwell time (the amount of time the inverse collimator stays pointed in one direction), and whether to scan the full sphere range or only the top hemisphere. Step size is the size, in degrees, of each tilt step. The device pauses at each position, takes radiation measurements at the rate of 1 kHz and averages the measurements over the "Dwell Time", which is the amount of time the inverse collimator pauses at each position. The longer the Dwell Time, the higher the confidence in each measurement (less statistical error). It is also important to make sure that the Home Position has been set before a scan is started, because the scan starts from the Home Position. Once the proper settings are selected, the user can start an AutoScan. The software then prompts the user for a file where all the information from the AutoScan will be stored. At any time during the AutoScan process, the user can stop the scan by clicking the 'Stop Scan' button. The user can also view a partial image by clicking the 'View Image' button while the scan is running. The scanning process is paused while mathematical processing of the data takes place. The scan remains paused until the partial image is displayed. Once the scan is complete, the full image is displayed in the form of a sphere (or hemisphere) around the device. A flowchart of the steps of the automatic mode is shown in FIGS. 12A-12B.

Figure 11:
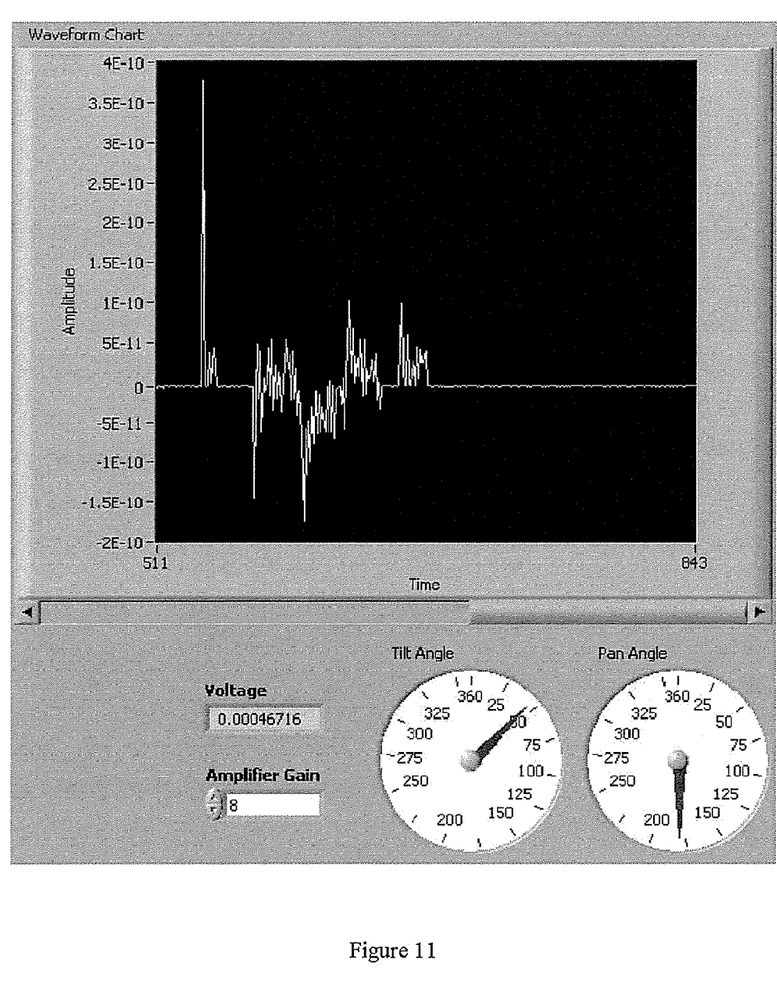
FIG. 11 shows a screen capture of an extra information tab employed in a system for performing directional radiation detection using inverse collimation.

Preferably, during both manual and automatic modes, additional information is provided by the LabVIEW, or equivalent, program, outside of the control program window. As shown in the example provided in FIG. 11, this additional information can include a visual display/guide for pan and tilt angles and raw data in the form of a running waveform display of real-time current measurement from the sensor, the voltage reading from the amplifier, and the amplifier gain setting (which can be controlled automatically, or manually from the program). If the gain control is being controlled automatically, the amplifier switches its gain when the voltage output goes out of a certain range (preferably 0.25 V to 8.5 V).

Optionally, the detection system of the present invention can further include a visual image capturing device (e.g., a camera) for obtaining a visual image of the environment under study, such as that described in U.S. Pat. No. 7,186,963. The visual image can be obtained prior to and/or during and/or after the radiation measurement for a particular direction or field of view within the environment. Once obtained information from one or more of the radiation measurements can be overlaid with one or more of the corresponding visual images.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A radiation detector for detecting the intensity and the direction of one or more sources of radiation comprising:
    (a) at least one radiation sensor;
    (b) an inverse collimator that shields the sensor by attenuating incident radiation originating from the direction in which the inverse collimator is pointed; and
    (c) a pan-tilt motor mechanism configured to point the inverse collimator in different directions.

2. The radiation detector of claim 1 wherein the inverse collimator is a rod.

3. The radiation detector of claim 2 wherein the rod has a circular cross-section.

4. The radiation detector of claim 2 wherein the rod comprises a metal or metal alloy.

5. The radiation detector of claim 4 wherein the metal or metal alloy is selected from the group consisting of tungsten, lead, and stainless steel.

6. The radiation detector of claim 2, wherein the at least one radiation sensor is mounted on an end of the rod.

7. The radiation detector of claim 6, comprising two radiation detectors mounted on opposing ends of the rod.

8. The radiation detector of claim 1 wherein the pan-tilt motor mechanism is configured to move the inverse collimator to change its altitudinal orientation and its azimuthal orientation.

9. The radiation detector of claim 8 wherein the pan-tilt motor mechanism comprises a tilt motor configured to change the altitudinal orientation of the inverse collimator and a pan motor configured to change the azimuthal orientation of the inverse collimator.

10. The radiation detector of claim 9 wherein the tilt motor, the pan motor or both the tilt and the pan motors are electric motors.

11. The radiation detector of claim 10 wherein the electric motors are step motors.

12. The radiation detector of claim 1, wherein said inverse collimator is a diametrical spoke of a gear wheel and wherein the pan-tilt motor mechanism comprises:
    (i) a tilt motor that rotates said gear wheel about its central axis to change the altitudinal orientation of said inverse collimator; and
    (ii) a pan motor that rotates said gear wheel about a second axis perpendicular to said central axis to change the azimuthal orientation of said inverse collimator.

13. The radiation detector of claim 1 wherein the sensor is a semiconductor diode.

14. The radiation detector of claim 13 wherein the semiconductor diode is a p-n junction silicon diode.

15. The radiation detector of claim 1 wherein the inverse collimator comprises two longitudinally aligned parts that are separated from each other by at least a portion of the pan-tilt motor mechanism, and wherein the pan-tilt motor mechanism contributes to the shielding of the detector from the at least a portion of the incident radiation originating from the direction in which the inverse collimator is pointed.

16. The radiation detector of claim 15 wherein the radiation sensor is attached to one of the inverse collimator parts.

17. The radiation detector of claim 15 wherein two radiation sensors are employed, with one radiation sensor attached to each of the two parts of the inverse collimator.

18. A radiation detector for detecting both the intensity and the direction of one or more sources of radiation comprising:
    (a) a pan motor;
    (b) a tilt motor;
    (c) a u-shaped support with a base and two arms;
    (d) an inverse collimator comprising a first rod and a second rod; and
    (e) a radiation sensor;
    wherein the shaft of the pan motor is operably connected to the base of the u-shaped support such that rotation of the shaft causes rotation of the u-shaped support;
    wherein the tilt motor is operably connected to the arms of the u-shaped support such that rotation of the shaft causes rotation of the tilt motor within the arms;
    wherein the first and second rods are attached to the tilt motor in longitudinal alignment with each other but on opposite sides of the axis of rotation of the tilt motor;
    wherein the radiation sensor is mounted to the first rod at the end of the first rod that is farthest from the tilt motor;
    wherein rotation of the pan and tilt motors allows the inverse collimator to be pointed in different directions; and
    wherein the inverse collimator and tilt motor shield the sensor by attenuating incident radiation originating from the direction in which the second rod is pointed.

19. A method for detecting the intensity and the direction of one or more sources of radiation comprising the steps of:
    (a) providing at least one radiation sensor;
    (b) providing an inverse collimator that shields the at least one sensor by attenuating incident radiation originating from the direction in which the inverse collimator is pointed;
    (c) providing a pan-tilt motor mechanism configured to point the inverse collimator in different directions;

(d) pointing the inverse collimator in a direction;
(e) recording the direction in which the inverse collimator is pointed and recording the signal from the sensor; and
(f) repeating steps (d) and (e) one or more times for one or more different directions.

* * * * *